Nov. 4, 1952 — N. D. ABBEY — 2,616,325

TUBE CHAMFERING AND CUTOFF MECHANISM

Filed Nov. 13, 1947 — 5 Sheets-Sheet 1

INVENTOR.
Nelson D. Abbey
BY
ATTORNEY

Nov. 4, 1952 N. D. ABBEY 2,616,325
TUBE CHAMFERING AND CUTOFF MECHANISM
Filed Nov. 13, 1947 5 Sheets-Sheet 2
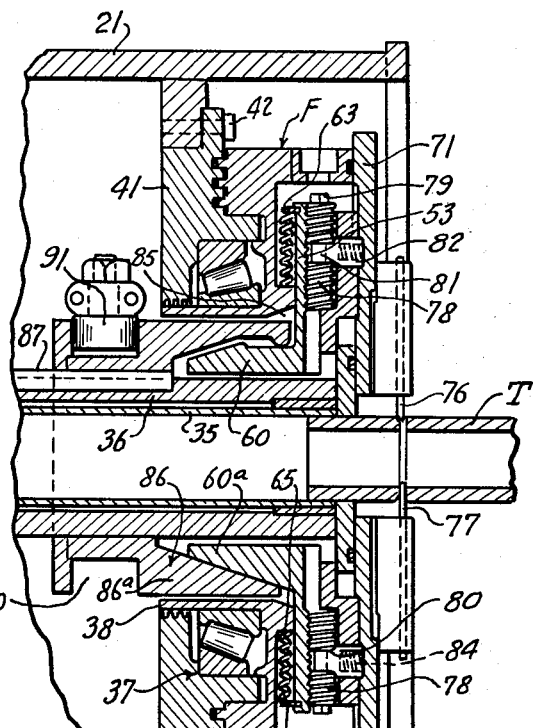
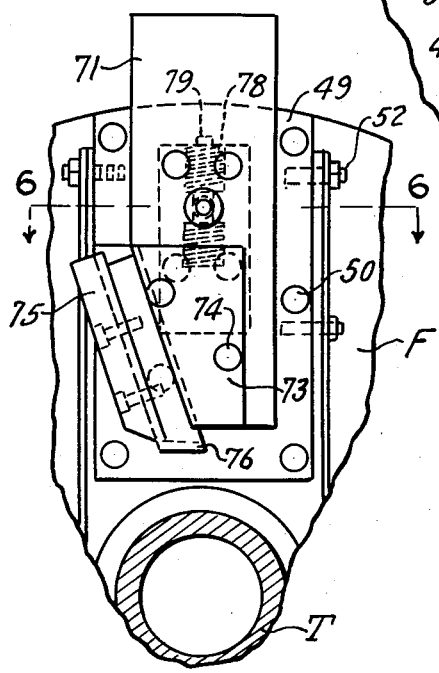
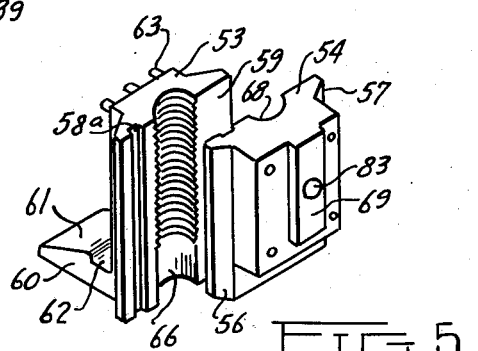
INVENTOR.
Nelson D. Abbey
BY
ATTORNEY Nov. 4, 1952 N. D. ABBEY 2,616,325
TUBE CHAMFERING AND CUTOFF MECHANISM
Filed Nov. 13, 1947 5 Sheets-Sheet 4
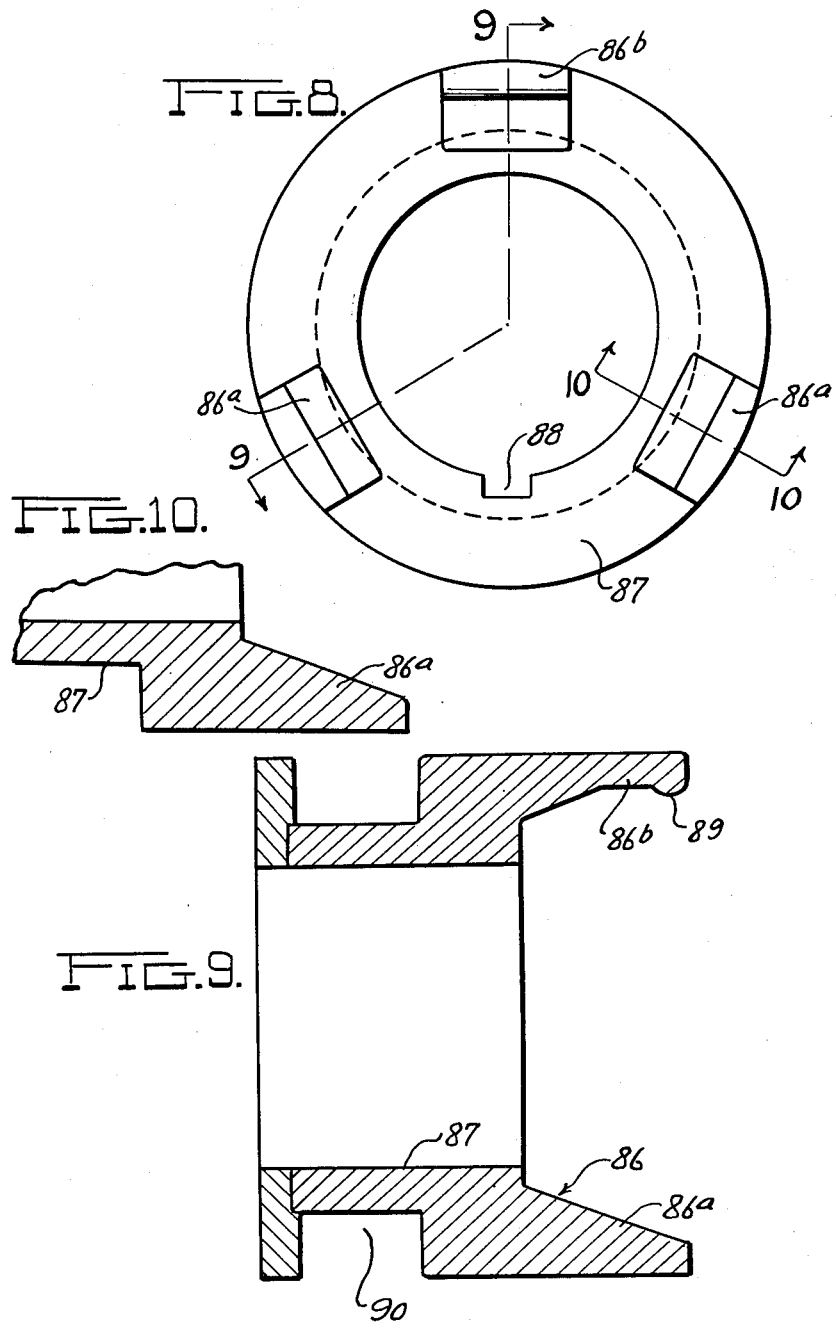
INVENTOR.
Nelson D. Abbey
BY
ATTORNEY

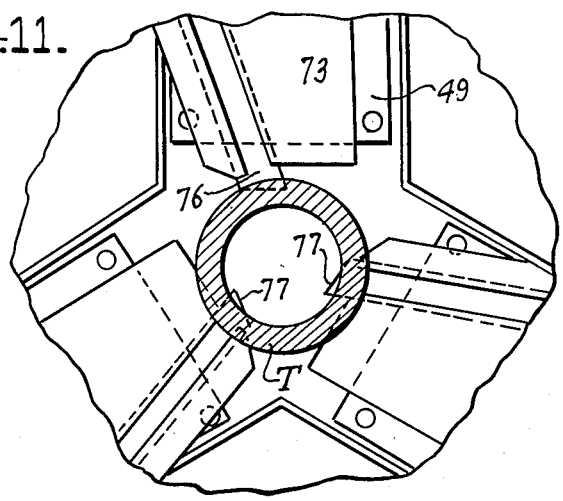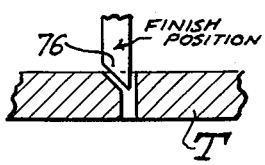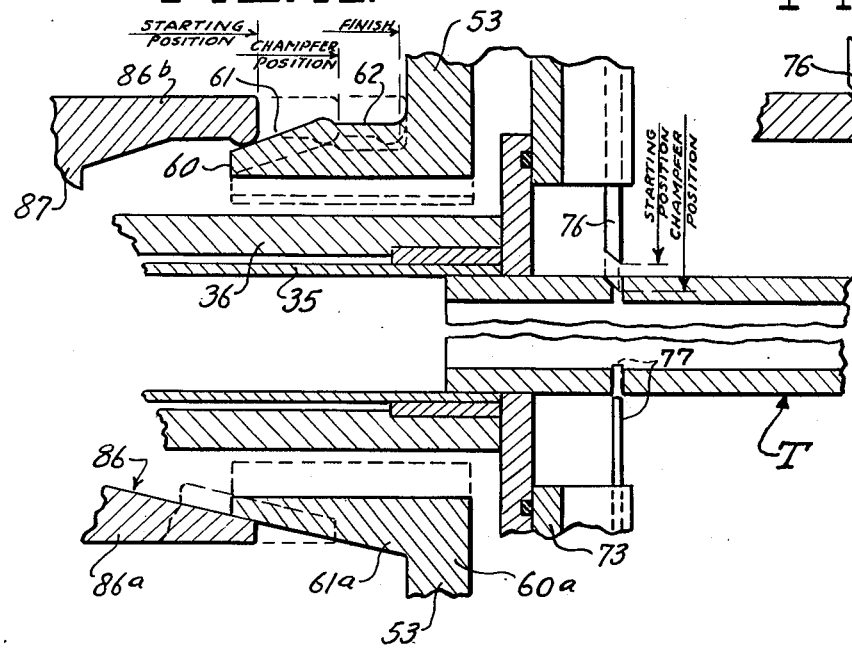

Patented Nov. 4, 1952

2,616,325

UNITED STATES PATENT OFFICE 2,616,325

TUBE CHAMFERING AND CUTOFF MECHANISM

Nelson D. Abbey, Toledo, Ohio, assignor to The Etna Machine Company, Toledo, Ohio, a corporation of Ohio Application November 13, 1947, Serial No. 785,701

6 Claims. (Cl. 82—20)

1

This invention relates to machines for working tubular members and more particularly to machines for cutting tubes, pipes and rods into measured lengths and chamfering the ends.

The invention contemplates the use of a machine of the type described for cutting substantially endless lengths of tubing or pipe fabricated either continuously by apparatus associated therewith or by equipment located at a distant station and apart from the tube cutting and chamfering machine. It will be understood that it is impractical to employ the ordinary metal working machine of the type wherein the work is rotated between stationary cutting or other tube working tools because such rotation is not permitted with tubing fabricated continuously by an associated machine, and endless or long lengths of tubing, if unsupported, will be subjected to a dangerous whipping action.

An object of this invention is to produce a tube working machine employing revolving tube cutting and chamfering tools to perform the desired tube cutting and chamfering operation while the tubing is stationarily fixed in position to be worked on by the tools.

Another object is to produce a new and improved tube cutting and chamfering mechanism in which the operating parts are actuated, after a proper initial adjustment, automatically and successively to clamp the tube in fixed position to be worked upon by the cutting and chamfering tools, actuate the revolving tools through the working cycle in such manner that a finished chamfer is provided on the cut end during the cutting operation, and then successively to retract the tools and unclamp the tube whereupon the machine is ready for another cycle of operation.

A further object is to provide in a machine of the type described, hydraulic actuators operated from a common source for causing the tube clamping and tube working tools to become effective and ineffective in the desired order and to govern the rate of feed of said tools so that they are slowly actuated through their working stroke after being rapidly advanced to their working position, and to interpose between the hydraulic actuators and the working tools, a tool actuating member for regulating the length as well as the stroke pattern of the working tools whereby the chamfering tool follows the cutting tool into the work and is retracted therefrom to effect a finishing operation before the cutting operation has been completed.

A further object is to produce a machine of the type described having means interposed between the hydraulic tool actuator and the tools themselves for transmitting linear movement of said actuator in one direction to variable movement of said tool in either radial direction so that one tool may be advanced steadily through the wall of the tube while another is advanced and retracted in the same working stroke.

A still further object is to provide, in a machine of the type described, a tool for advantageously and economically chamfering the end of tubing during the tube cutting operation.

These and other objects and advantages of the invention will become apparent from the ensuing description and claims and, for purposes of illustration but not of limitation, an embodiment of the invention is shown in the accompanying drawings, in which Figure 1 is a front elevational view of the tube clamping and severing mechanism;

Figure 3 is a sectional view taken substantially along the line 3—3 of Figure 1;

Figure 4 is an enlarged fragmentary elevational view showing the tool carrier and a cutting tool in the inoperative position;

Figure 5 is a perspective view of the two cooperating parts which are radially shiftable and adjustable and to which the tool carrier is connected;

Figure 8 is an enlarged elevational view of the tool actuating collar;

Figure 9 is a sectional view taken along the line 9—9 of Figure 8;

Figure 10 is a sectional view taken along the line 10—10 of Figure 8;

Figure 11 is an enlarged fragmentary elevational view showing the relative positions of the cutting and chamfering tools with respect to the tube to be cut at the extremes of the working cycle;

Figure 12 is a schematic sectional view showing the positions of the tools corresponding to the various positions of the actuating collar, the spindle being omitted for purposes of clarity; and Figure 13 is a detail sectional view indicating the position of the chamfering tool during finishing operation.

Briefly described, the embodiment of the invention comprises a machine for automatically cutting tubing and finishing the ends thereof by a chamfering operation. In order to accomplish the desired results, the machine is designed to clamp the tubing before the cutting and chamfering operations to fix the tubing in position to be worked upon by the revolving tools. Thereafter, the tools are radially advanced while revolving about the tube to effect cutting and chamfering operations and then are retracted prior to the release of the tubing. Controls are provided so that after proper initial adjustment, the operations may take place automatically and in proper sequence and other adjustments are provided for adapting the machine for tubular or rod-like members of different diameters. Ordinarily, in practice, measured lengths of tubing are fed to the machine and the machine automatically discharges measured lengths of finished tubing without the aid of an operator. Controls are also provided for manually effecting one or more of the desired movements when desired.

Figure 1:
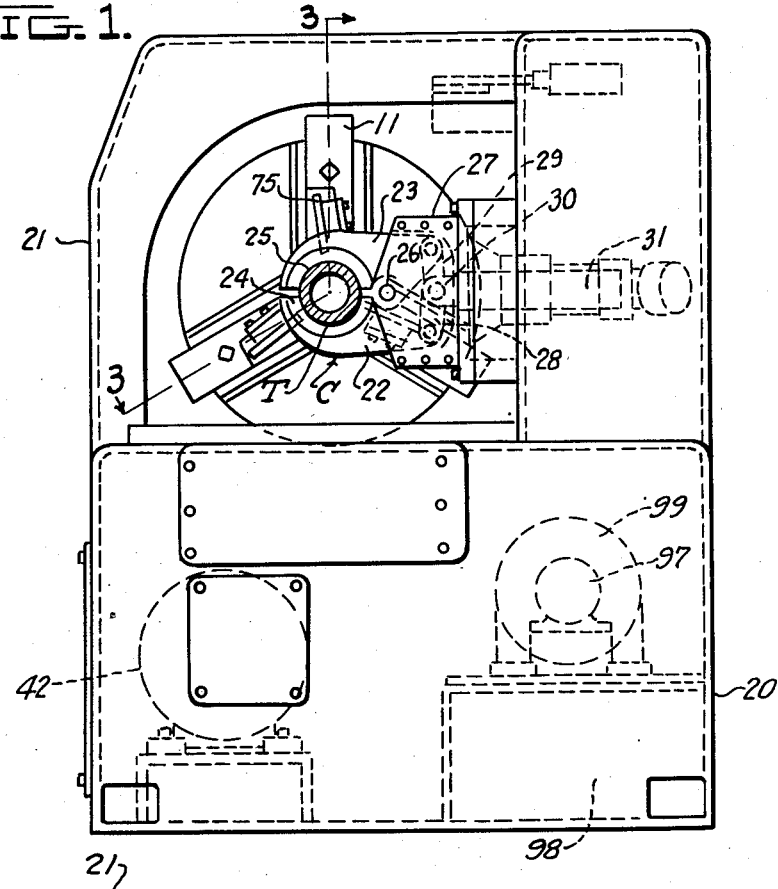
Figure 2:
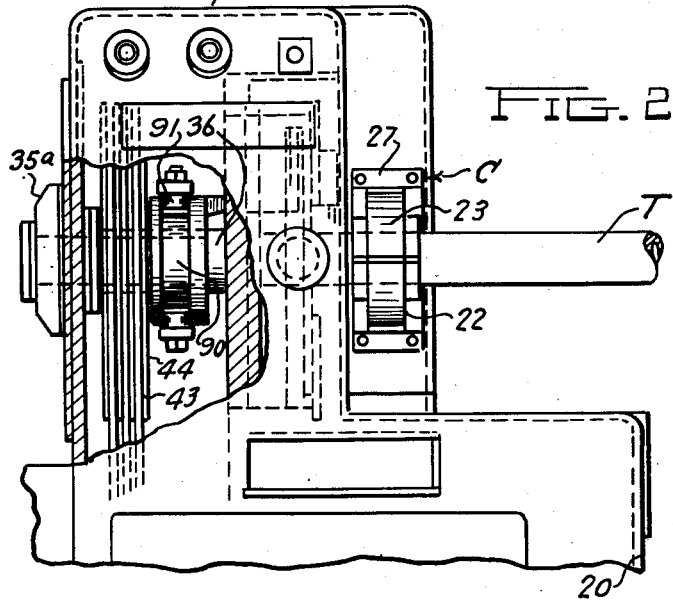
Figure 2 is a side elevational view of the tube clamping and severing machine with some parts broken away more clearly to illustrate enclosed parts of the tube clamping and severing mechanism shown in Figure 1.

Referring now to Figures 1 and 2 of the drawings, 20 is a rectangular base, which supports a housing 21, within which the tube cutting and chamfering mechanisms are concealed. In advance of the housing, there is shown a tube clamping mechanism C for gripping and holding the tube T in a fixed position to be acted upon by the tube cutting and chamfering tools, later to be described.

The tube clamping mechanism C comprises a pair of complementary clamping members 22 and 23 having facing semi-circular jaws 24 and 25 respectively adapted more firmly to grip a substantial portion of the tube T disposed therebetween. The clamping members rock on a common pivot in the form of a shaft 26 carried by a stationary bracket 27. Rocking movement to and from the tube clamping position is imparted to the clamping members by a toggle consisting of a pair of links 28 and 29 connecting the outer ends of the members 22 and 23 respectively, with the forward end of a piston rod 30. The piston rod in turn has a piston at its inner end which is operative in a cylinder 31 having fittings at the outer and inner ends thereof for admitting pressure fluid in advance or in rear of the piston whereby the piston is caused to move longitudinally within the cylinder. When pressure fluid is admitted to the cylinder in advance of the piston, the piston rod is moved to the right (Figures 1 and 7) and the clamping jaws are rocked away from each other to release the tubing T. When pressure fluid is admitted to the rear of the piston, the clamping jaws are rendered effective and they remain effective securely to hold the tubing in position as long as such pressure fluid is operative on the piston.

The clamping mechanism C is not rendered effective until a measured length of tubing has been advanced in the direction of the machine. If such movement takes place after a cutting and chamfering cycle of operations has been completed, a corresponding length of tubing is displaced beyond the working tools and is disposed and supported within a stationary liner 35 (Figure 3) which extends through the casing 21. A cap member 35a fixed to the casing 21 supports the outer end of the liner. Rotatable about the liner 35 is a spindle 36 supported on anti-friction thrust bearings 37. One race of the bearing 37 is mounted on a collar 38 integral with an annular spindle flange F (Figures 3 and 6) which, in turn, is integral with the rearward end portion of the spindle 36, while the other race is positioned within an annular groove formed in an annular plate 41 secured by bolts 42 to the housing. The spindle flange F has a series of ring-like ribs 39, which ride in grooves 40 formed in the annular plate 41 to provide an oil seal between the relatively rotating parts.

As illustrated in Figures 1 and 2 of the drawings, rotational movement is imparted to the spindle 36 by an electric motor 42 connected by V-belts 43 to sheaves 44 keyed to the spindle 36.

The working tools, hereinafter to be described, are mounted radially of the tube to be severed in equidistantly spaced relation and adapted for movement toward and away from such tube to effect the various working operations, that is, the severing of the tube and the chamfering of the severed end. In the illustrated embodiment of the invention, only three such tools and mountings therefor are shown, two of them carrying cutting tools and the other a chamfering tool. However, it will be understood that as few as two tools or more than three in various combinations of cutting and chamfering tools may be advantageously employed. For each tool mounting, the spindle flange F is provided with a pair of transversely spaced radially extending ribs 45 and 46 (Figure 6), each of which provides a seat for gibs 47 and 48 respectively, which face each other and are held in place by a plate 49 secured to the ribs by bolts 50. Each gib is formed with a substantially V-shaped groove 51 and can be adjusted toward and away from the other by set screws 52.

Figure 6:
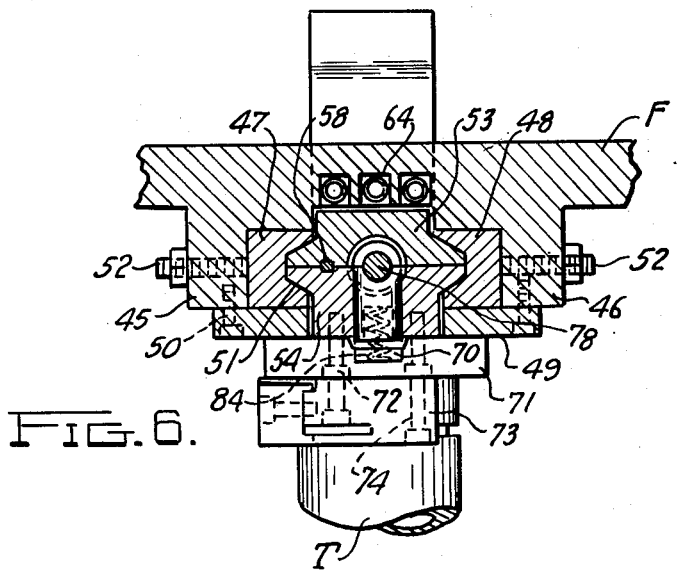
Figure 6 is a transverse sectional view taken along the line 6—6 of Figure 4.

Radially shiftable within the gibs 47 and 48 are a pair of cooperating parts 53 and 54, each having tapered guides 56 and 57 (Figure 5) extending laterally from the side walls. When the cooperating parts are assembled, the adjacent guides together form sections which are V-shaped in cross section and have sliding contact with the V-shaped grooves 51 and 52 of the gibs (Figures 5 and 6). A key 58 insertable in contiguous grooves 58a formed in the inner faces of the cooperating parts 53 and 54 militates against lateral movement of these parts during their operative radial movement.

One of the cooperating parts, that is, part 53, is provided with an integral wedge member 60, which extends at substantially right angles from its lower end. The contour of the wedge depends on the working tool with which it is associated. For example, when associated with the chamfering tool, the upper surface of the wedge has an upwardly tapered cam surface 61 merging by a curvilinear surface with a downwardly recessed flat surface 62, which extends to the outer face of the part 53. The other wedges 60a, associated with the cutting tools, are formed with relatively smooth tapered cam surfaces 61a, which extend to the outer face of the part 53 (Figures 3, 5 and 12).

Pins 63 projecting in the same direction as the wedge, but from the upper portion of the wedge-carrying member 53, are engaged by one end of coil compression springs 64, the other ends bearing against a ledge or shoulder 65 formed in the spindle flange F. Thus it will be seen that the coil springs constantly urge the part 53 radially in the direction away from the tubing.

The inner face 59 of the part 53 has a centrally disposed longitudinally extending semi-circular groove 66 which is formed with screw threads 67. The other cooperating part 54 is similarly formed with a groove 68 except that it is free of screw threads. When in the assembled relation, the semi-circular grooves 66 and 68 together form a circular opening.

The outer face of the part 54 is formed with a protruding rectangular guide key 69 which enters a groove 70 in an adaptor plate 71 for positioning the plate on the part 54 to which it is secured by screws 72. A tool holder 73 is secured to the plate 71 by screws 74 and is provided with an angularly disposed guideway 75. Secured, as by screws, to each tool holder 73, is the desired tool, that is, a chamfering tool 76 on one, and a cutting tool 77 on each of the other holders.

The part 54 with its attached tool holder 73 is adjusted radially with respect to the other cooperating wedge carrying part 53 by an adjusting screw 78. The screw, having a squared end 79 for aiding turning movement, fits in the circular opening formed by the semi-circular grooves 66 and 68 and engages the screw threads 67. A reduced neck 80 intermediate the ends of the screw receives a forked end 81 of a key member 82, which fits through a transverse opening 83 in the part 54. The key is constantly urged into engagement with the screw by a coil spring 84, one end of which extends from the rear of a socket within the key and engages the adaptor plate 71. By turning the screw 78 in one direction or the other, the part 54 and the tool holder is shifted radially relative to the tubing to enable proper initial adjustment of the tool. This is to compensate for the various types of tools that may be employed and the various diameters or wall thicknesses of the tubing or pipe to be severed.

It will be manifest that the spindle 36, spindle flange F and the attached tools and tool holders revolve together as a unit. In order to shift each of the revolving cooperating parts 53 and 54 and their attached tool holder radially relative to the spindle flange F and the stationarily positioned tubing T, the wedge member 60 or 60a of each part 53 extends into a rectangular guide opening 85 in the base of the spindle flange F. Extending from the opposite direction into each of the rectangular openings 85 is an actuating member 86 integral with a collar 87, which is axially slidable along the spindle 36 but is secured for rotation therewith by a key 87' engaging a keyway 88 in the collar and spindle. The faces 86a of two of the wedge-shaped actuating members are formed with relatively smooth gradually tapering cam surfaces, which are recurrently engageable respectively with the cam surfaces 61a operatively connected to the cutting tools. The face 86b of the other actuating member is formed with a rounded end portion 89, which is slidably engageable with the cam surface 61 above described.

Figure 7:
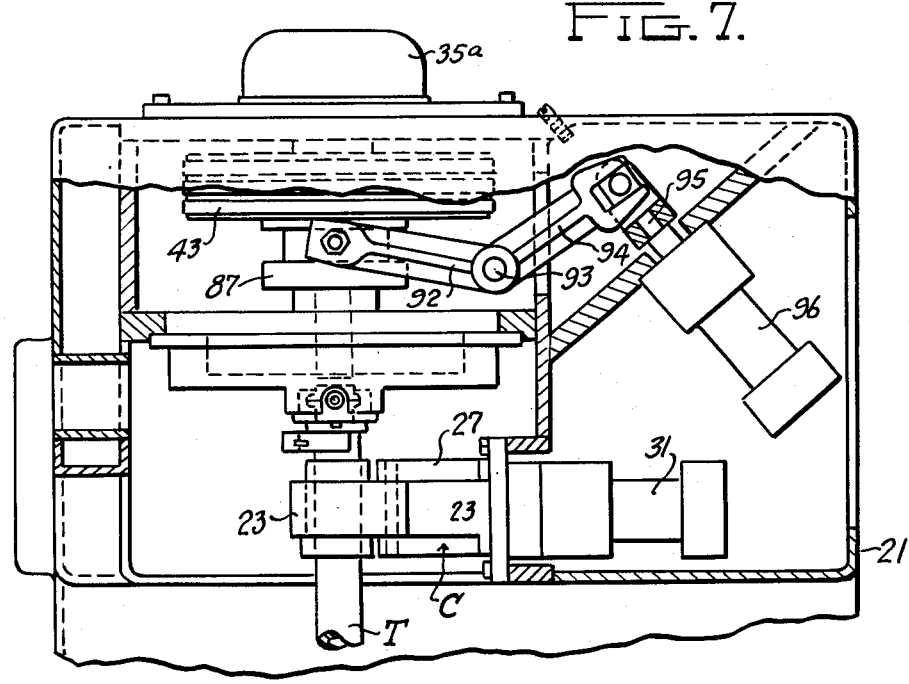
Figure 7 is a top plan view of the machine with part of the housing broken away to show the relationship between the clamping and cutting tool assemblies.

Referring now to Figures 3, 7 and 9, the collar 87 is formed with an annular groove 90, which receives rollers 91 carried by the end of a yoke arm 92. The yoke arm 92 is actuated by a yoke arm 94, both arms being rigid with a pivot pin 93. Operatively engaging the yoke arm 94 is an hydraulic piston 95 operating within a cylinder 96. Thus, it will be understood that in response to hydraulic pressure, the collar 87 is shifted axially in one direction or the other during rotary movement of the collar and spindle 36.

For example, as pressure fluid is admitted to the rear end of the cylinder 96, the piston is moved outwardly or in the direction to the left in Figure 7. Through the connections described, the collar 86 is moved axially in the direction of the wedges 60 and 60a. As indicated by the broken lines and solid lines in Figure 13, such movement causes the wedge-like members 86a and 86b to slide along the cam surface of the respective wedges 60a and 60 to actuate the tools radially in the direction of the tube T. The camming action between the surfaces of the wedge-shaped members 86a and the wedges 60a causes the cutting tool to move steadily in the direction toward the tube T to be severed, the movement being sufficient, when the tools have been initially adjusted properly, to cut through the wall of the tube to effect the severing operation. Similar engagement between the rounded end portion 89 of the wedge-shaped member 86b and the surface of the other wedge or cam 60 causes the chamfering tool 76 associated therewith to advance toward and into the previously cut portion of the tube to effect the chamfering operation. However, as the rounded portion 89 enters the recess 62, the chamfering tool and its associated parts are retracted a short distance (Figure 13). The tool dwells in this latter portion during the remainder of the axial movement of the collar 87 in the same direction for completing the severing operation. The amount of retraction of the chamfering may be regulated by the depth of the depression to offset the tool from the chamfered surface an amount sufficient to effect a finishing operation. The surface of the recessed portion may be upwardly inclined or otherwise contoured to impart predetermined movements to the chamfering tool for effecting finishing or other operations.

When the severing tools 77 have passed through the wall of the tube T, hydraulic fluid is admitted to the head end of the piston 95 and the collar 86 is returned to its original position causing the wedge-shaped members 86a and 86b also to return and enable the coil springs 64 to become operative for retracting the tools from the tube T. It will be understood that the chamfering tool may be initially adjusted to engage the tube after the severing tools have become effective so that the chamfering tool may be operative on the cut portion of the tube and may take place in its entirety during the cutting operation.

As described, the tube clamping mechanism and the tube severing mechanism are hydraulically actuated, hydraulic fluid being directed from a pump 97 (Figure 1) associated with a reservoir 98 and driven by an electric motor 99. Reference is here made to my Patent No. 2,484,601, granted October 11, 1949, and entitled "Tube Clamping and Severing Machine," for a description of a hydraulic system and the associated controls and valves for automatically securing a sequence of operations wherein the clamping mechanism is actuated to secure the tube T in position to be acted upon by the metal working tools, the tube severing and chamfering tools are rendered effective for severing and for chamfering the severed end of the tube, and then successively to render the tube working mechanism and the tube clamping mechanism ineffective in preparation for another cycle of operations, that is, after a predetermined length of tubing has been fed into the machine. As set forth in the application referred to, valve means may be provided in the hydraulic system for imparting variable movement to the working tools whereby they are rapidly carried to working position and then slowly advanced through the working cycle, followed by rapid traverse back to their ineffective or starting positions. Fast and slow movements or even movements of other patterns, such, for example, as retractive movements of one tool while the others are still advancing in the direction toward the clamped tube, may be effected by selected contours on the surfaces of the wedge-shaped members 86a and 86b or the wedge members 60 or 60a. It will be also understood that manual controls may be provided in the system and on the machine for effecting the various operations in or out of sequence.

From the description, it will be apparent that I have produced a machine whereby substantially endless lengths of tubing may be cut into predetermined lengths and have the ends chamfered in a very practical manner. By employing the machine described, the power consumption is reduced and safety features are enhanced because the long and heavy tubing is not revolved. Instead, it is held stationary while cutting tools of small weight are revolved and radially actuated to effect the desired tube cutting and chamfering operations. The hydraulic system with its controls provides for a predetermined and safe sequence of operations, whereby the tubing is stationarily clamped before the cutting and chamfering tools are operative and released only after the same tools have completed their working cycle and are returned or are being returned to their original position. Within the hydraulic system, valve means may be provided for imparting variable fast and slow radial movements to the tools to effect cutting and chamfering with greatest efficiency. While the hydraulic means operates to actuate the tools in radial movement, wedge and cam means are interposed for transmitting variable movement to the cutting and chamfering tools whereby chamfering takes place on the cut end of the tube after cutting has started and is completed along with a finishing operation before cutting has been completed, all of these operations taking place in one operating cycle.

It is to be understood that numerous changes in details of construction, arrangement and operation may be effected without departing from the spirit of the invention especially as defined in the appended claims.

What I claim is:

1. In a tube working machine, a stationary tube severing and chamfering mechanism comprising a revolving head, tool carriers mounted on said head for relative radial movement thereof while revolving together as a unit, a tube cutting tool and a tube chamfering tool mounted on separate tool carriers for movement therewith to effect tube cutting and chamfering operations during radial movement thereof, cam means connected for radial movement with each of said tool carriers, wedge means revoluble with but movable axially of said head for radially moving said carriers in the direction toward working operation responsive to axial movement of said wedge means in one direction, and other means for retracting said carriers in response to axial movement of said wedge means in the other direction.

2. In a tube working machine, a stationary tube severing and chamfering mechanism comprising a revolving head, tool carriers mounted on said head for relative radial movement thereof while revolving together as a unit, a tube cutting tool and a tube chamfering tool mounted on separate tool carriers for movement therewith to effect tube cutting and chamfering operations during radial movement thereof, a cam connected to each tool carrier for radial movement therewith, and wedge means revoluble with said head and movable axially relative thereto cooperating with each cam for imparting radial movement to the respectively connected carrier in accordance with the surface contour of the cam whereby variable radial movements are imparted to the tool carriers.

3. In a tube working machine, a stationary tube severing and chamfering mechanism comprising a revolving head, tool carriers mounted on said head for relative radial movement thereof while revolving together as a unit, a tube cutting tool and a tube chamfering tool mounted on separate tool carriers for movement therewith to effect tube cutting and chamfering operations during radial movement thereof, a cam connected to each tool carrier for radial movement therewith, and wedge means revoluble with and movable axially of said head cooperating with each cam for imparting radial movement to the respectively connected tool carrier in accordance with the surface contour of the cam whereby the cutting tools are steadily advanced through the wall of the tube to be cut and the chamfering tool is advanced into the wall of the tube and retracted before the cutting operation is completed.

4. In a tube working machine, a stationary tube severing and chamfering mechanism comprising a revolving head, tool carriers mounted on said head for relative radial movement thereof while revolving together as a unit, a tube cutting tool and a tube chamfering tool mounted on separate tool carriers for movement therewith to effect tube cutting and chamfering operations during radial movement thereof, a cam connected to each tool carrier for radial movement therewith, and wedge means revoluble with and movable axially of said head cooperating with each cam for imparting radial movement to the respectively connected tool carrier in accordance with the surface contour of the cam whereby the cutting tools are steadily advanced through the wall of the tube to be cut and the chamfering tool is advanced for the chamfering operation and slightly retracted for a finishing operation while the tube is being cut.

5. In a tube working machine, a stationary tube severing and chamfering mechanism comprising a revolving head, tool carriers mounted on said head for relative radial movement thereof while revolving together as a unit, a tube cutting tool and a tube chamfering tool mounted on separate tool carriers for movement therewith to effect tube cutting and chamfering operations during radial movement thereof, a cam having a tapered surface connected for radial movement with each of the tube cutting tools, a cam having a recess in the tapered surface connected for radial movement with the chamfering tool, and an actuating member revoluble with and movable axially of the head to make sliding contact with the cam surfaces whereby the cutting and chamfering tools are moved radially in a pattern corresponding to the contour of their respectively connected cam surface.

6. A tube working machine as claimed in claim 5, in which the actuating member comprises wedges corresponding in number to the cams connected to the working tools, a collar concentric with and movable axially of the head from which the wedges extend, said collar being movable axially in the direction toward said cams to effect operative radial movement of said tools, and spring means operative for retracting said tools upon movement of said collar in the other direction.

NELSON D. ABBEY.

REFERENCES CITED

The following references are of record in the file of this patent:

UNITED STATES PATENTS

| Number | Name | Date |
| --- | --- | --- |
| Re. 20,974 | Guirl et al. | Jan. 10, 1939 |
| 155,143 | Chester | Sept. 22, 1874 |
| 1,782,692 | Lawson | Nov. 25, 1930 |
| 2,186,061 | Berg et al | Jan. 9, 1940 |
| 2,484,601 | Abbey | Oct. 11, 1949 |